United States Patent

Tokano et al.

[11] Patent Number: 5,815,610
[45] Date of Patent: Sep. 29, 1998

[54] OPTICAL MODULATION SYSTEM

[75] Inventors: Yuichi Tokano; Ryoji Muramatsu; Takanobu Tanabe; Tsugio Takeda, all of Sendai, Japan

[73] Assignee: Tokin Corporation, Miyagi, Japan

[21] Appl. No.: 810,557

[22] Filed: Mar. 3, 1997

Related U.S. Application Data

[62] Division of Ser. No. 397,077, Mar. 7, 1995, Pat. No. 5,638,468.

[30] Foreign Application Priority Data

| Jul. 7, 1993 | [JP] | Japan | 5-168156 |
| Dec. 6, 1993 | [JP] | Japan | 5-339978 |
| Jan. 26, 1994 | [JP] | Japan | 6-24758 |

[51] Int. Cl.$^6$ .................................................. G02F 1/035
[52] U.S. Cl. .................................................................. 385/2
[58] Field of Search ........................... 385/2, 3, 14, 901

[56] References Cited

U.S. PATENT DOCUMENTS

| 4,877,298 | 10/1989 | Teng et al. | 385/2 |
| 4,936,645 | 6/1990 | Yoon et al. | 385/2 |
| 5,091,983 | 2/1992 | Lukosz | 385/13 |
| 5,267,336 | 11/1993 | Sriram et al. . | |
| 5,333,217 | 7/1994 | Kossat | 385/13 |

FOREIGN PATENT DOCUMENTS

| 0 445 763 A3 | 9/1991 | European Pat. Off. . |
| 0445763 | 9/1991 | European Pat. Off. . |
| 49-98648 | 9/1974 | Japan . |
| 53-90747 | 8/1978 | Japan . |
| 2-291518 | 12/1990 | Japan . |
| 3-189616 | 8/1991 | Japan . |

OTHER PUBLICATIONS

IEEE Photonics Technology Letters, Jun., 1991, USA, vol. 3, No. 6, ISSN 1041–1135, pp. 510–512, XP 000227339 C.H. Bulmer, et al "Phase Tuning By Laser Ablation Of LiNbO$_3$ Interferometric Modulators To Optimum Linearity".

Primary Examiner—Rodney B. Bovernick
Assistant Examiner—Robert E. Wise
Attorney, Agent, or Firm—Frishauf, Holtz, Goodman, Langer & Chick

[57] ABSTRACT

A system comprises a substrate 4, an incident optical waveguide 5 formed on the substrate for receiving a light beam incident thereto, two phase-shift optical waveguides 6 formed on the substrate 4 to be branched from the incident optical waveguide 4 for varying a phase of a transmitted light beam in response to an electric field intensity, an outgoing optical waveguide 7 formed on the substrate 4 to join the phase-shift optical waveguides 6. At least one of the phase-shift optical waveguides 6 has a reversely polarized portion 8 reversely polarized. A light transmission film may be formed at one or a plurality of portions on the phase-shift optical waveguides 6. A buffer layer 14 may be formed on a part on or in the vicinity of the phase-shift optical waveguides 6. A transparent substance film for imparting a stress to one of the phase-shift optical waveguides 6 may be formed on a part or a whole of a portion without the buffer layer 14. A stress imparting member may be formed to impart a stress to a part of one of the phase-shift optical waveguides 6. A light irradiation unit 26 may be formed to irradiate a light beam onto a part or a whole of one of the phase-shift optical waveguides 6.

6 Claims, 9 Drawing Sheets

OPTICAL MODULATION SYSTEM

This is a division of application Ser. No. 08/397,077 filed Mar. 7, 1995 (now U.S. Pat. No. 5,638,468 issued Jun. 10, 1997).

TECHNICAL FIELD

This invention relates to an optical modulation system for modulating a light beam transmitted through an optical waveguide by applying an external electric field.

BACKGROUND ART

There is known a conventional optical modulation system comprising a light source, an optical device supplied with a light beam from the light source, and an electric field applying device for applying an electric field to the optical device. The optical device comprises a substrate, an incident optical waveguide formed on the substrate for receiving the light beam incident thereto, two phase-shift optical waveguides formed on the substrate to be branched from the incident optical waveguide for varying a phase of a transmitted light beam in response to an electric field intensity, and an outgoing optical waveguide formed on the substrate to join the phase-shift optical waveguides.

In the conventional optical modulation system, however, a phase difference is caused between the branched optical waveguides even if the intensity of the applied electric field is equal to zero, depending upon manufacturing conditions of the optical waveguides. This results in fluctuation of a ratio of the variation of light intensity relative to the variation of the applied electric field, namely, fluctuation of an optical modulation efficiency.

In addition, the conventional optical modulation system is disadvantageous in that the optical device tends to deteriorate when the magnitude of the applied electric field is great.

It is an object of this invention to provide an optical modulation system capable of readily adjusting a phase difference when the intensity of an applied electric field is equal to zero.

It is an object of this invention to provide an optical modulation device capable of avoiding deterioration of an optical device even if the magnitude of an applied electric field is great.

DISCLOSURE OF THE INVENTION

This invention is characterized by provision of a substrate, an incident optical waveguide formed on the substrate for receiving a light beam incident thereto, two phase-shift optical waveguides formed on the substrate to be branched from the incident optical waveguide for varying an intensity of a transmitted light beam in response to a phase of an electric field, and an outgoing optical waveguide formed on the substrate to join the phase-shift optical waveguides, at least one of the phase-shift optical waveguides having a reversely polarized portion reversely polarized.

This invention is also characterized by provision of a substrate, an optical waveguide formed on the substrate for varying an intensity of a transmitted light beam in response to an intensity of an electric field, and a light transmission film formed at one or a plurality of areas on the optical waveguide.

This invention is also characterized by a buffer layer formed at a part on or in the vicinity of the phase-shift optical waveguides.

This invention is also characterized by a buffer layer formed at a part on or in the vicinity of the phase-shift-optical waveguides, and a transparent substance film formed on a part or a whole of a portion without the buffer layer for imparting a stress on the phase-shift optical waveguides.

This invention is also characterized by a stress imparting member for imparting a stress to a part of one of the phase-shift optical waveguides.

This invention is also characterized by a light irradiation unit for irradiating a light beam onto a part or a whole of one of the phase-shift optical waveguides.

EMBODIMENTS

Figure 1:
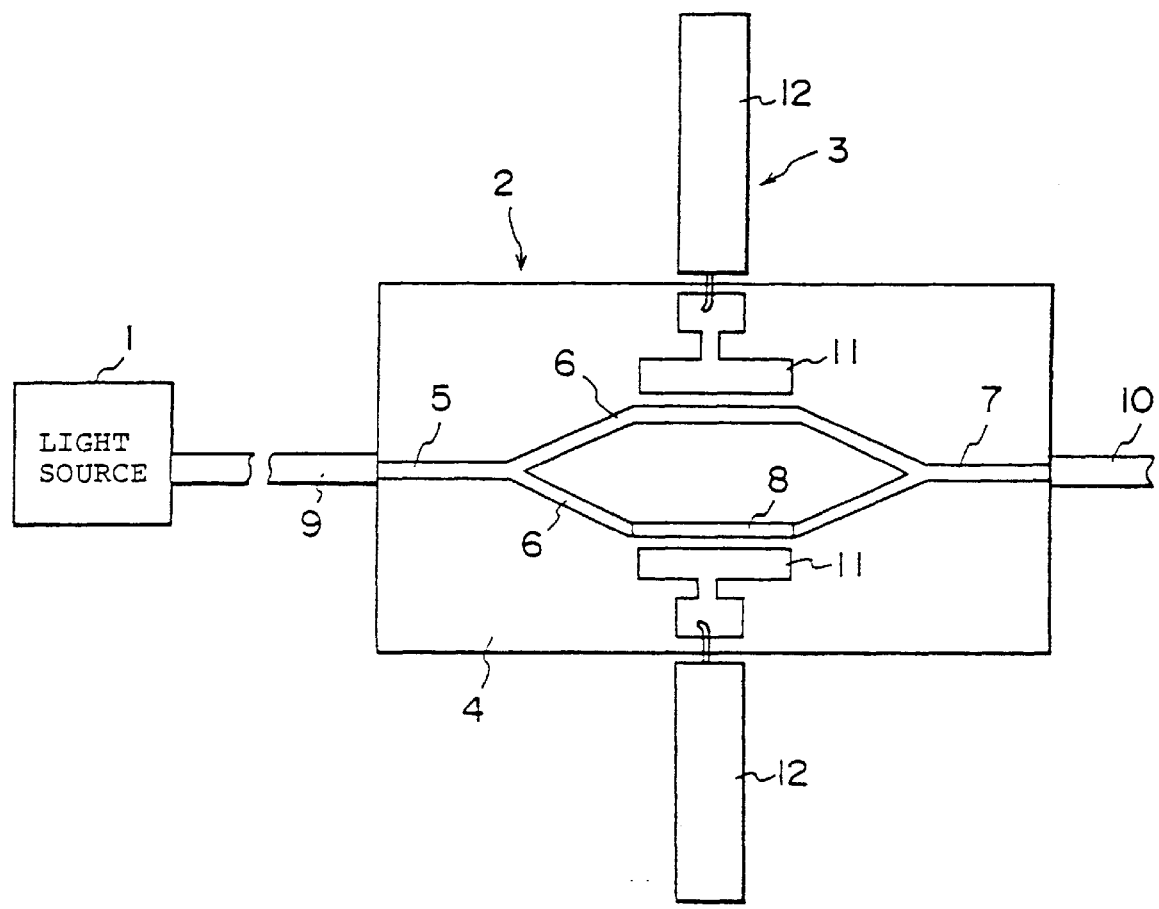
FIG. 1 is a front view of an optical modulation system according to this invention.

Now, description will be made in detail as regards several embodiments of this invention with reference to the drawing.

FIG. 1 is a front view of a first embodiment of this invention. As illustrated in FIG. 1, an optical modulation system according to this invention comprises a light source 1, an optical device 2 for receiving a light beam from the light source 1, and an electric field applying device 3 for applying an electric field to the optical device 2. The optical device 2 comprises a substrate 4, an incident optical waveguide 5 formed on the substrate 4 for receiving the light beam incident thereto, two phase-shift optical waveguides 6 formed on the substrate 4 to be branched from the incident optical waveguide 5 for varying a phase of a transmitted light beam in response to an intensity of an electric field, and an outgoing optical waveguide 7 formed on the substrate 4 to join the phase-shift optical waveguides 6. At least one of the phase-shift optical waveguides 6 has a reversely polarized portion reversely polarized.

The light source 1 and the incident optical waveguide 5 are connected through an incident optical fiber 9. The light beam from the light source 1 is incident through the incident optical fiber 9 to the incident optical waveguide 5 and branched by the two phase-shift optical waveguides 6 into branched beams which are again combined together in the outgoing optical waveguide 7. The outgoing optical waveguide 7 is connected to an outgoing optical fiber 10. The light beam after combined together in the outgoing optical waveguide 7 is emitted through the outgoing optical fiber 10.

The electric field applying device 3 comprises two modulation electrodes 11 formed on the substrate 4 and located on or in the vicinity of the phase-shift optical waveguides 6, and antennas 12 connected through lead wires to the modulation electrodes 11, respectively. When a reception signal is received by the antennas 12, the modulation electrodes 11 apply predetermined electric fields to the phase-shift optical waveguides 6. Depending upon the intensities of the electric fields, the refractive indexes of the phase-shift optical waveguides 6 are varied. This results in variation of phases of the light beams transmitted through the phase-shift optical waveguides 6. The reversely polarized portion 8 has an optical axis direction different from that of the remaining portion of the phase-shift optical waveguides 6 except the reversely polarized portion 8 and, accordingly, provides the transmitted light beam with a reverse phase shift reverse to that given by the remaining portion when a uniform electric field is applied to the substrate 4. This results in variation of an intensity of an outgoing light beam.

Next, description proceeds to a specific example of the first embodiment of this invention.

The substrate 4 was formed from a Z-cut lithium niobate (LiNbO$_3$) crystal plate. On the surface of the substrate 4, the incident optical waveguide 5, the phase-shift optical waveguides 6, and the outgoing optical waveguide 7, having a width of 8 $\mu$m and a depth of 6 $\mu$m, were formed by thermal diffusion of Ti. A part of the phase-shift optical waveguides 6 that is to serve as the reversely polarized portion 8 has a length of 25 mm. A distance between parallel portions of the two phase-shift optical waveguides is equal to 20 $\mu$m.

An SiO$_2$ layer was deposited to a thickness of about 0.5 $\mu$m on the substrate 4, the incident optical waveguide 5, the phase-shift optical waveguides 6, and the outgoing optical waveguide 7. Through photoresist patterning and SiO$_2$ etching, a part of one of the two phase-shift optical waveguides 6 was exposed.

Then, a heat treatment was carried out at 1000° C. for two hours in a wet oxygen atmosphere. After completion of heating, natural cooling was carried out in an electric furnace. Thus, the reversely polarized portion 8 of the phase-shift optical waveguides 6 was formed. The SiO$_2$ left on the crystal surface was removed by the use of a buffer etching fluid.

The optical device thus manufactured was connected to the incident optical fiber 9 which is a polarization plane maintaining fiber and to the outgoing optical fiber 10 which is a single mode fiber. The light source 1 comprises a laser which has a propagation laser beam wavelength of 1.31 $\mu$m.

Figure 2:
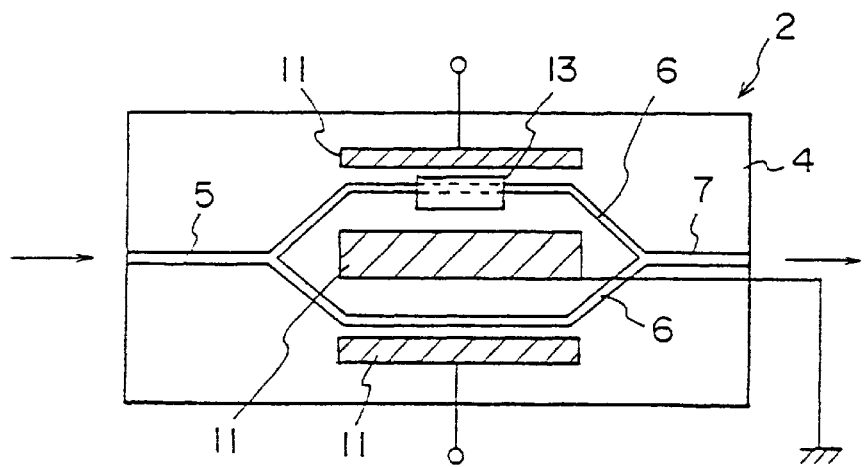
FIG. 2 is a front view of another embodiment of this invention.

As illustrated in FIG. 2, the optical device 2 which is a Mach-Zehnder interferometer was manufactured as an embodiment of this invention by the use of the LiNbO$_3$ substrate 4 cut along an X axis. Manufacturing conditions are as follows. Thermal diffusion (at 1025° C. for five hours in a wet O$_2$ atmosphere) was carried out by the use of Ti having a thickness of 800 angstroms. The modulation electrodes 11 for applying an applied voltage to the branched phase-shift optical waveguides 6 in a C-axis direction of the substrate 4 were formed by vapor deposition of Cr—Au.

Figure 3:
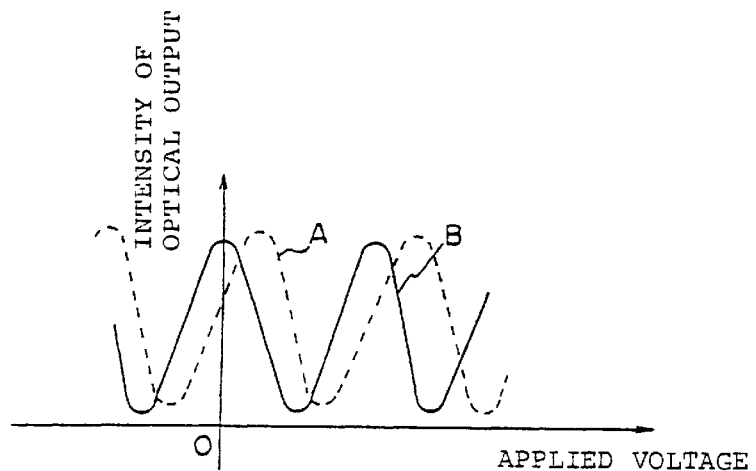
FIG. 3 is a view for describing a characteristic of the embodiment in FIG. 2.

By sputtering SiO$_2$ to a thickness of 1500 $\mu$m, a light transmission film 13 was formed at a part (having a width of 15 mm) of one of the branched optical waveguides 6 of the optical device 2. In case where the conventional optical device having no light transmission film 13 is applied with the voltage, the intensity of an optical output varies along a curve A illustrated in FIG. 3. On the other hand, when the optical device 2 having the light transmission film 13 is applied with the voltage, the light intensity varies along a line B illustrated in FIG. 3. From this, it has been proved that the phase of the optical device 2 can be adjusted according to this embodiment.

Figure 4:
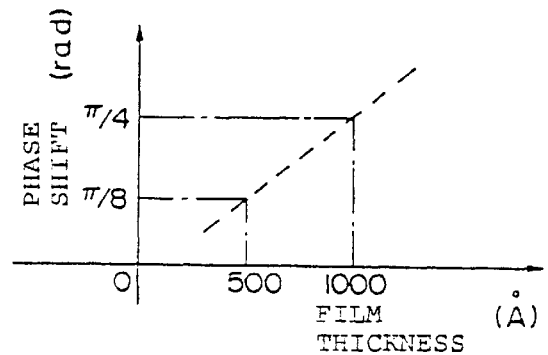
FIG. 4 is a view for describing another characteristic of the embodiment in FIG. 2.

FIG. 4 shows one example of the data about output variation with respect to the thickness of the light transmission film 13. As is clearly seen, when the light transmission film 13 comprising an SiO$_2$ film is formed by a sputtering process, the shift amounts in output bias are equal to $\pi/8$ and $\pi/4$ for the film thickness of 500 angstroms and 1000 angstroms, respectively. The element used has a half-wavelength voltage of 1.5 V. In this description, the bias indicates a point on the curve of the optical output intensity in FIG. 3 when no voltage is applied to the optical waveguide.

Figure 5:
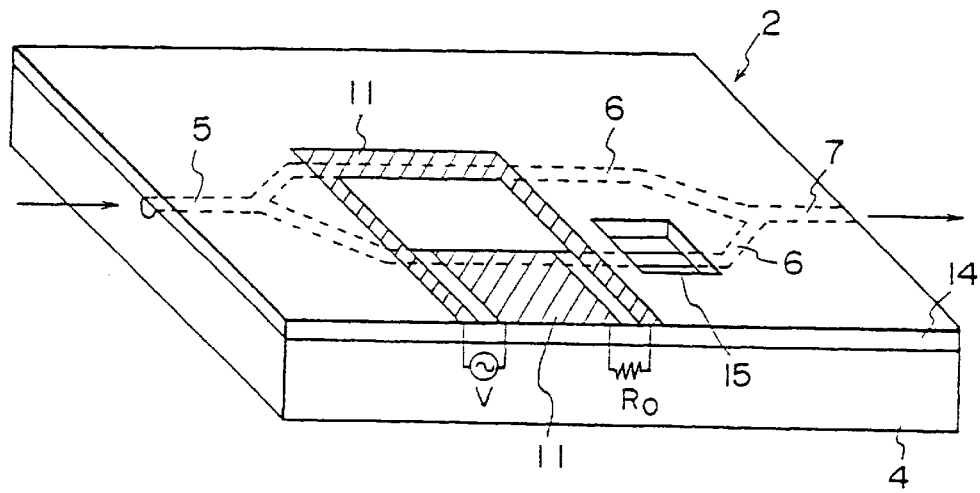
FIG. 5 is a perspective view of another embodiment of this invention.

As illustrated in FIG. 5, the optical device 2 comprises the incident optical waveguide 5, the phase-shift optical waveguides 6, and the outgoing optical waveguide 7 which are formed on the LiNbO$_3$ substrate 11 by thermal diffusion of titanium at a temperature between 900° and 1100° C. for several hours and which have a width between 5 and 12 $\mu$m and a depth between 3 and 10 $\mu$m.

A buffer layer 14 of SiO$_2$ is formed on the incident optical waveguide 5, the phase-shift optical waveguides 6, the outgoing optical waveguide 7, and the substrate 4. On the buffer layer 14, the modulation electrodes 11 having a width between 10 and 30 $\mu$m are formed. A part of the buffer layer 14 that is positioned on one of the phase-shift optical waveguides 6 is cut away to form an opening 15.

Figure 6:
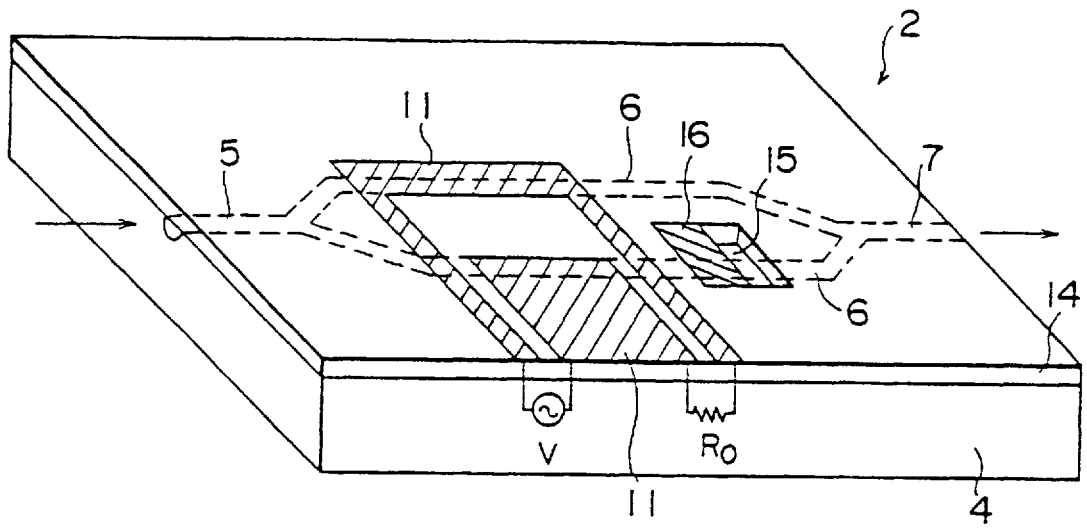
FIG. 6 is a perspective view of another embodiment of this invention.
Figure 7:
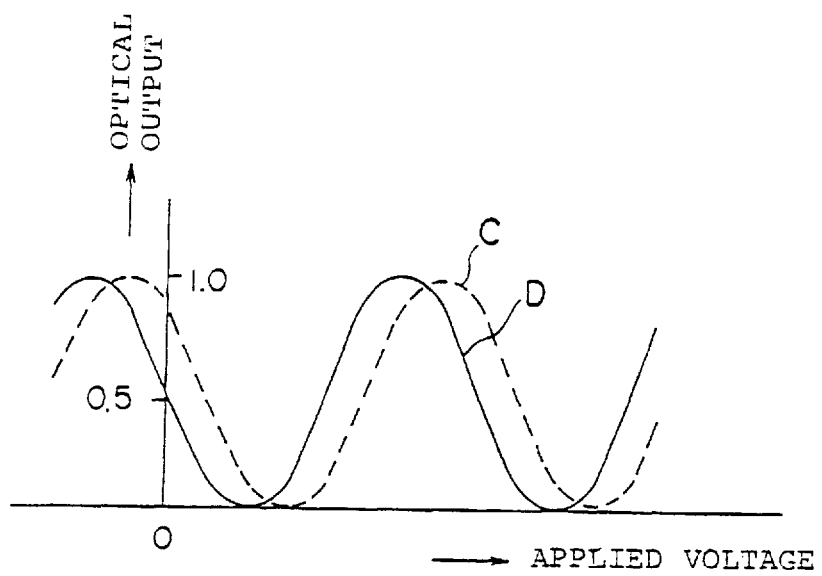
FIG. 7 is a view for describing a characteristic of the embodiment in FIG. 6.

As illustrated in FIG. 6, in the optical device 2, a portion without the SiO$_2$ buffer layer 14 is partially coated with a substance, such as a cyanoacrylate adhesive 16, for imparting a stress onto a part of the phase-shift optical waveguide 6. The adhesive 16 serves to vary the refractive index of the phase-shift optical waveguide 6 so as to provide a phase difference between two phase-shift optical waveguides 6. The light intensity characteristic when the voltage is applied to the optical device 2 in FIG. 6 is changed from that depicted by a curve C to that depicted by a curve D in FIG. 7.

Figure 8:
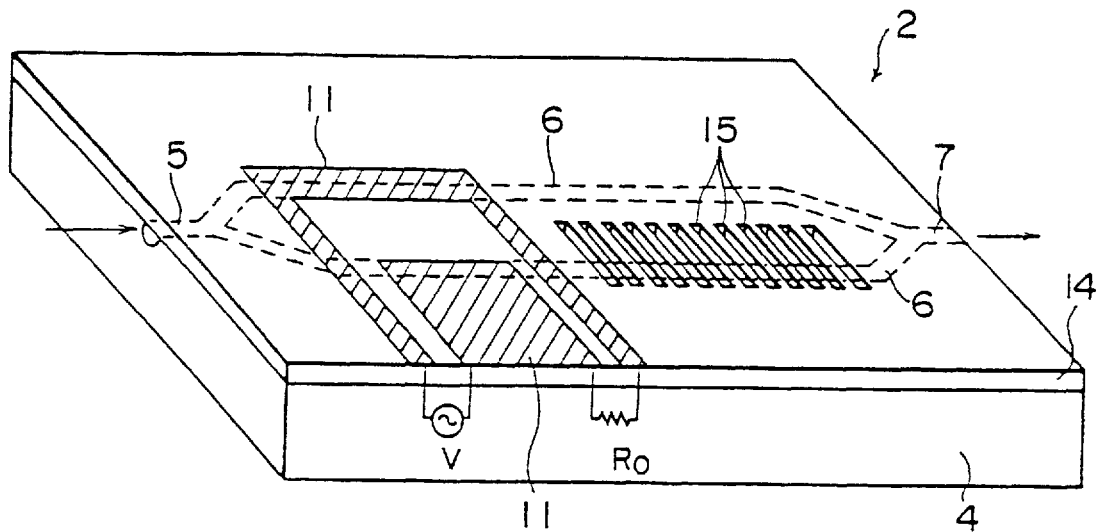
FIG. 8 is a perspective view of another embodiment of this invention.

As illustrated in FIG. 8, in the optical device 2, a plurality of openings 15 may be formed through the buffer layer 14 on the phase-shift optical waveguide 6.

Figure 9:
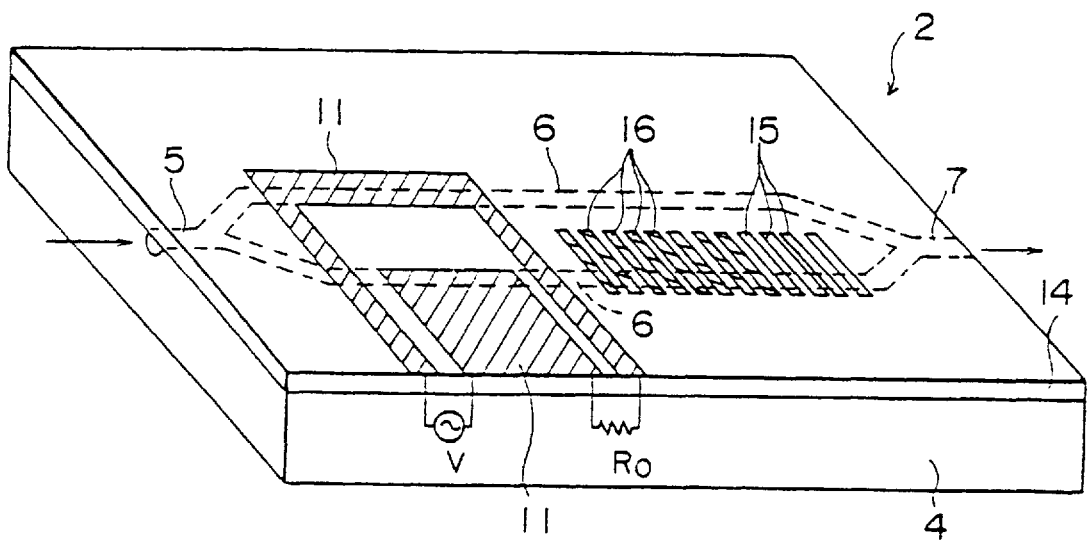
FIG. 9 is a perspective view of another embodiment of this invention.

As illustrated in FIG. 9, in the optical device 2, a plurality of openings 15 may be formed through the buffer layer 14 on the phase-shift optical waveguide 6 with the adhesive 16 filled in a predetermined number of openings 15 among those openings 15 to coat the phase-shift optical waveguide 6.

According to this embodiment, it is possible to provide a desired optical phase difference after manufacture of the incident optical waveguide 5, the phase-shift optical waveguides 6, and the outgoing optical waveguide 7.

THIRD EMBODIMENT

Description will now be made as regards a third embodiment of this invention with reference to the drawings.

Figure 10:
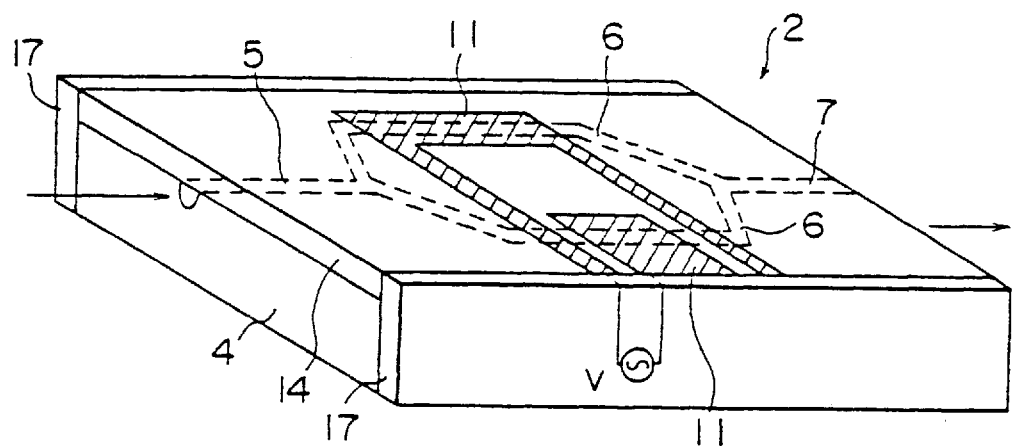
FIG. 10 is a perspective view of another embodiment of this invention.

As illustrated in FIG. 10, the optical device 2 comprises the substrate 4 with the incident optical waveguide 5, two phase-shift optical waveguides 6, the outgoing optical waveguide 7, and the modulation electrodes 11 formed on the substrate 4.

The incident optical waveguide 5, the phase-shift optical waveguides 6, and the outgoing optical waveguide 7 are formed by thermal diffusion of titanium (Ti) on the substrate 4 at a temperature between 900 and 1100° C. for several hours. The incident optical waveguide 5, the phase-shift optical waveguides 6, and the outgoing optical waveguide 7 have a width between about 5 and 12 µm and a thickness between about 3 and 10 µm. The modulation electrodes 11 have a width between 10 and 30 µm.

The buffer layer 14 is formed on the substrate 4, the incident optical waveguide 5, the phase-shift optical waveguides 6, and the outgoing optical waveguide 7. The buffer layer 14 is made of $SiO_2$. On the upper surface of the buffer layer 14, the modulation electrodes 11 are formed. The modulation electrodes 11 have a width substantially equal to 10 µm.

The substrate 4 has two side surfaces parallel to the light transmission direction. Stress imparting members 17 are arranged on the side surfaces in contact therewith. The stress imparting members 17 are made of a piezoelectric semiconductor. Being applied with a predetermined voltage, the stress imparting members 17 are deformed to impart a stress to the phase-shift optical waveguides 6 through the substrate 4. When the stress is imparted, the refractive indexes of the phase-shift optical waveguides 4 are varied so that the phases of the light beams transmitted through the phase-shift optical waveguides 6 are shifted.

Figure 11:
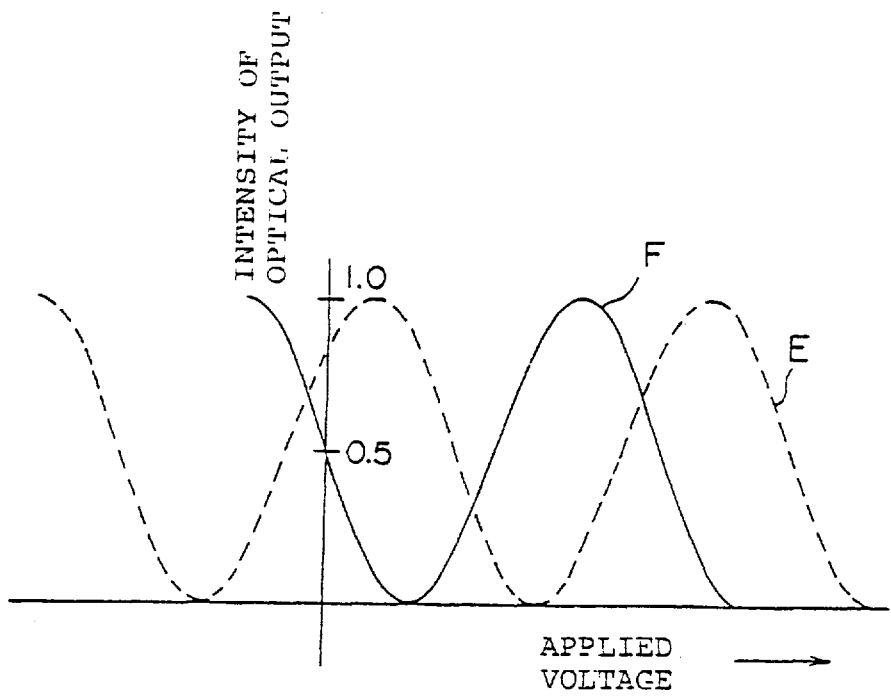
FIG. 11 is a view for describing a characteristic of the embodiment in FIG. 10.

For example, without any stress imparted by the stress imparting members 17 to the phase-shift optical waveguides 6, the intensity of the outgoing light beam is varied in response to variation of the applied voltage, as depicted by a curve E in FIG. 11. In this event, by the use of the stress imparting members 17 for imparting the stress to the phase-shift optical waveguides 6, adjustment can be made so that the intensity of the outgoing light beam is varied in response to the variation of the applied voltage, as depicted by a curve F in FIG. 11.

Figure 12:
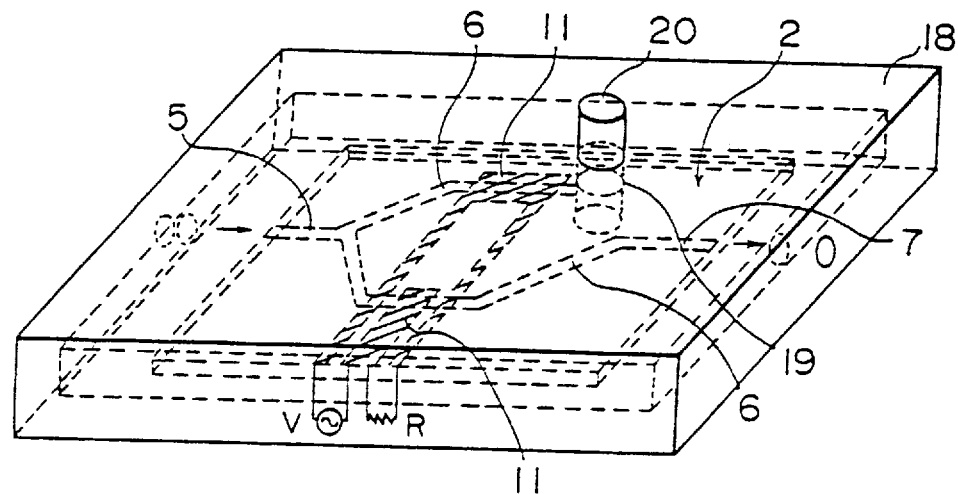
FIG. 12 is a perspective view of another embodiment of this invention.

As illustrated in FIG. 12, the optical device 2 is accommodated in a package 18. The package 18 is provided with a threaded hole 19 formed on a part thereof. A screw 20 is engaged in the threaded hole 19. The screw 20 constitutes the stress imparting member 17. A top end of the screw 20 is adapted to be pressed against the phase-shift optical waveguide 6. When the screw 20 imparts the stress to the phase-shift optical waveguide 6, the refractive index of the phase-shift optical waveguide 6 is varied.

Figure 13:
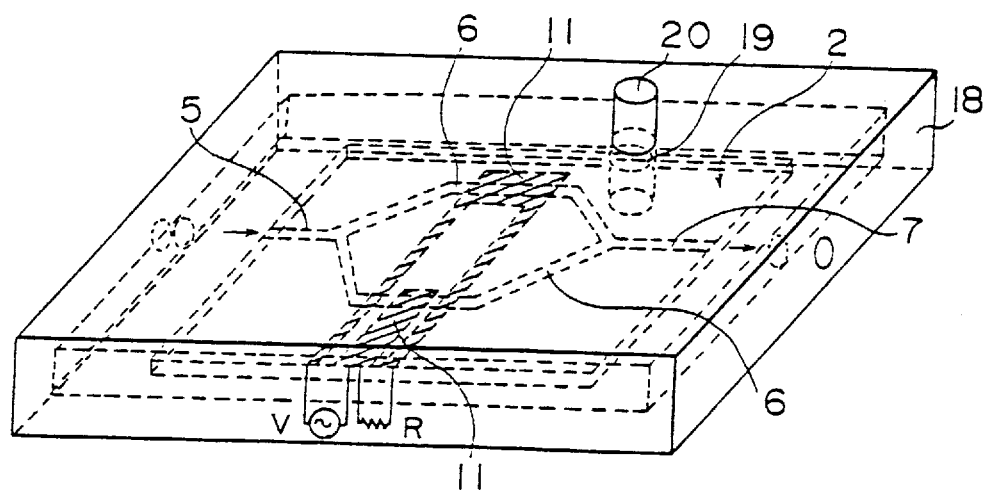
FIG. 13 is a perspective view of another embodiment of this invention.

As illustrated in FIG. 13, the screw 20 may press the substrate 4 in the vicinity of the phase-shift optical waveguide 6 so as to impart the stress to the phase-shift optical waveguide 6.

Figure 14:
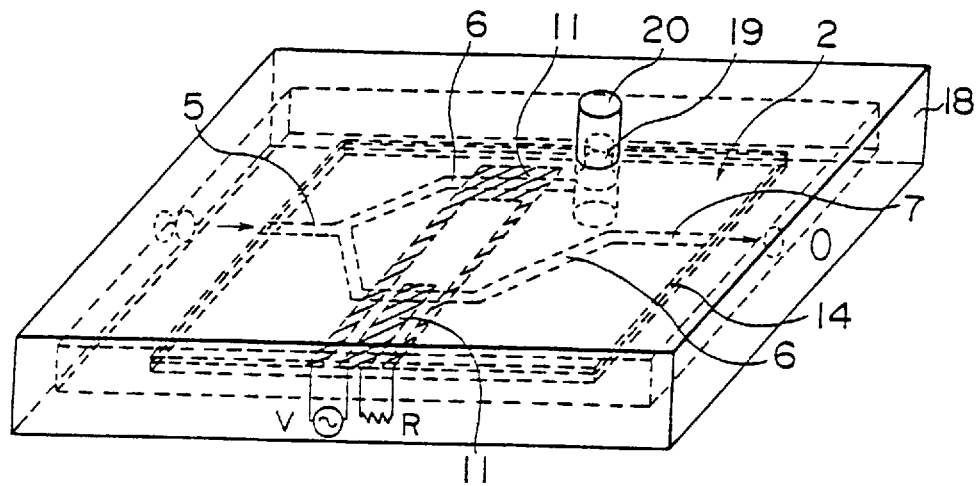
FIG. 14 is a perspective view of another embodiment of this invention.

As illustrated in FIG. 14, in case where the optical device 2 has the buffer layer 14, the screw 20 may press a part of the buffer layer 14 that is located on the phase-shift optical waveguide 6 so as to impart the stress to the phase-shift optical waveguide 6.

Figure 15:
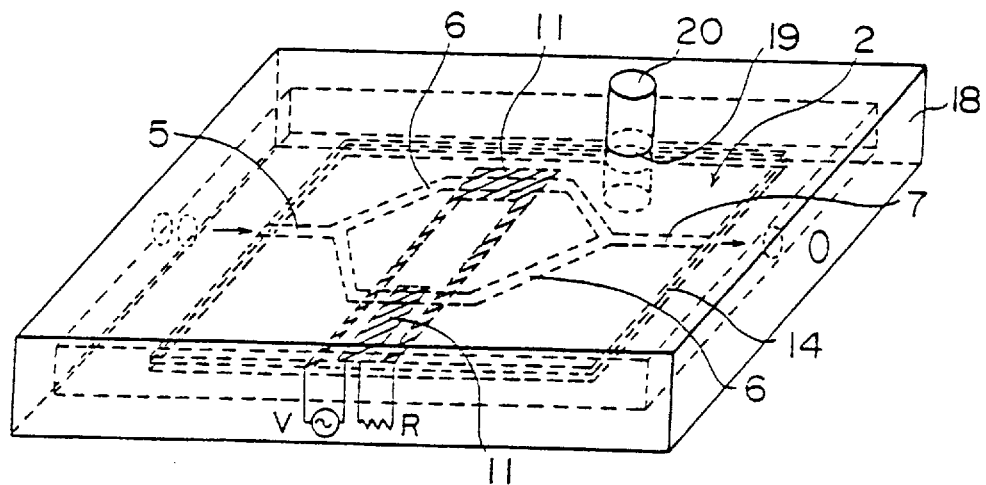
FIG. 15 is a perspective view of another embodiment of this invention.

As illustrated in FIG. 15, in case where the optical device 2 has the buffer layer 14, the screw 20 may press a part of the buffer layer 14 that is located in the vicinity of the phase-shift optical waveguide 6 so as to impart the stress to the phase-shift optical waveguide 6.

Figure 16:
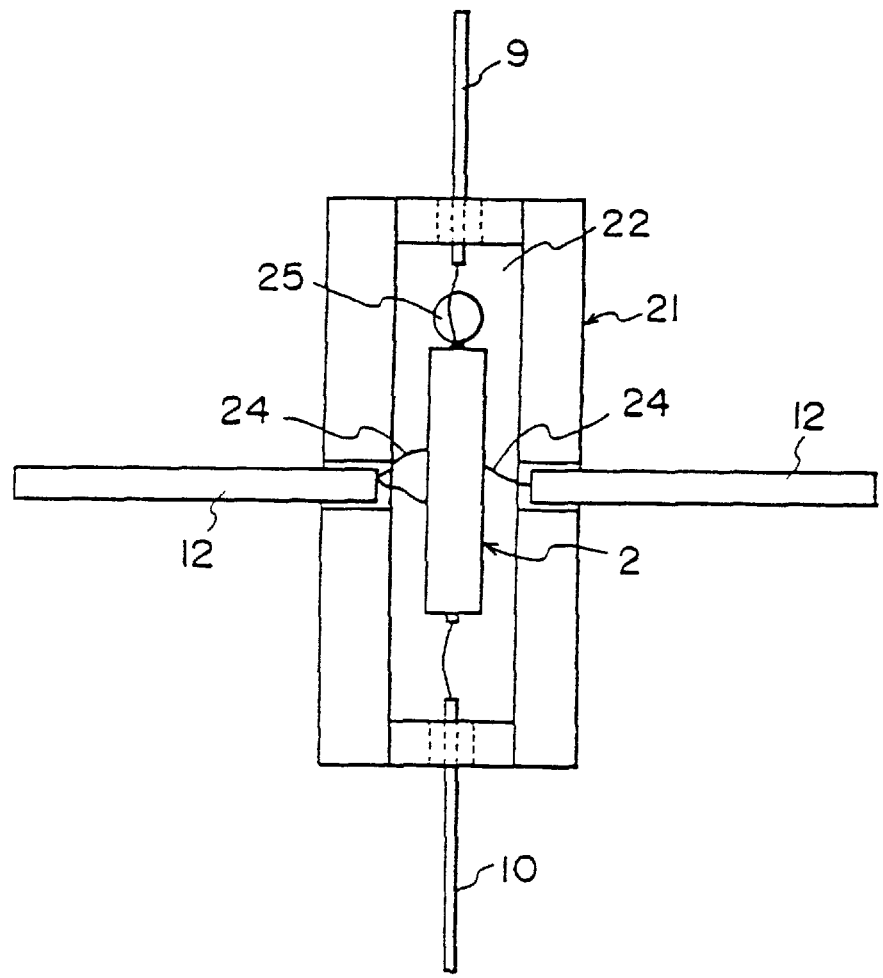
FIG. 16 is a front view of another embodiment of this invention.
Figure 17:
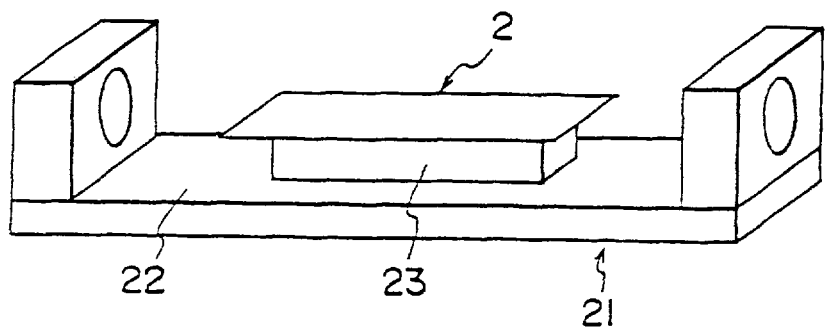
FIG. 17 is a perspective view of a main portion of the embodiment in FIG. 16.

As illustrated in FIGS. 16 and 17, the optical device 2 is accommodated in a package 21 having a thermal plasticity. The optical device 2 is fixed through silicone to a fixing table 23 formed on a bottom 22 of the package 21. To end faces of the incident optical waveguide 5 and the outgoing optical waveguide 7 of the optical device 2, the incident optical fiber 9 and the outgoing optical fiber 10 are connected, respectively. The antennas 12 are connected through lead wires 24 to the modulation electrodes 11 of the optical device 2. An ultraviolet ray is irradiated by an ultraviolet irradiation unit onto a predetermined part 25 of the bottom 22 of the package 21. The bottom 22 of the package 21 is thereby heated and deformed to impart the stress to the phase-shift optical waveguides 6. In case where the substrate 4 is accommodated in the package 21 in contact with the internal wall thereof, the substrate 4 need not be fixed to the package 21 by the use of the adhesive.

FOURTH EMBODIMENT

Next, a fourth embodiment of this invention will be described in detail with reference to the drawings.

Figure 18:
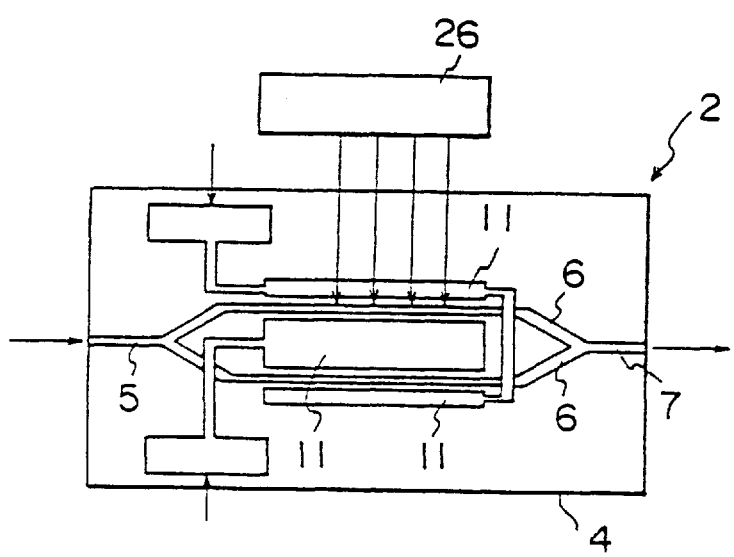
FIG. 18 is a front view of another embodiment of this invention.

As illustrated in FIG. 18, the optical device 2 comprises the substrate 4, the incident optical waveguide 5 formed on the substrate 4 for receiving the light beam incident thereto, two phase-shift optical waveguides 6 formed on the substrate 4 to be branched from the incident optical waveguide 5 for varying the intensity of the transmitted light beam in response to the intensity of the electric field, the outgoing optical waveguide 7 formed on the substrate 4 to join the phase-shift optical waveguides 6, and a light irradiation unit 26 for irradiating a part or a whole of one of the phase-shift optical waveguides 6.

The substrate 4 is made of lithium niobate ($LiNbO_3$) or the like. When the light beam is irradiated onto an electrooptical crystal such as lithium niobate, electrons in the crystal are excited from an impurity level to a conduction band so that the electrons are drifted in a +Z direction. During the drift, the excited electrons fall into a trap level. Accordingly, positive and negative portions are produced in the crystal to generate a space electric field. The space electric field brings about variation of the refractive index. This phenomenon is called an optical damage. This invention makes use of this phenomenon.

For example, the incident optical waveguide 5, the phase-shift optical waveguides 6, and the outgoing optical waveguide 7 are formed on the substrate 4 of lithium niobate by thermal diffusion of Ti. The thermal diffusion is carried out at a temperature of 1025° C. for five hours in a wet $O_2$ atmosphere. The incident optical waveguide 5, the phase-shift optical waveguides 6, and the outgoing optical waveguide 7 have a thickness of 500 angstroms and a width of 6 µm.

The optical device 2 has an insertion loss of 5.5 dB, an extinction ratio of 26.0 dB, and a half-wavelength voltage of 1.9 V.

INDUSTRIAL APPLICABILITY

This invention is adapted for use in an optical switch and an optical modulation system requiring a phase control. This invention can be used also as an electric field sensor for measuring an intensity of an electric field.

We claim:

1. An optical modulation system comprising:

a substrate;

an incident optical waveguide formed on said substrate for receiving a light beam incident thereto;

two phase-shift optical waveguides formed on said substrate and being branched from said incident optical waveguide for varying a phase of a transmitted light beam in response to an electric field intensity;

an outgoing optical waveguide formed on said substrate and joined to said two phase-shift optical waveguides; and a light transmission film formed at one or a plurality of portions on one of said two phase-shift optical waveguides.

2. The optical modulation system of claim 1, wherein said light transmission film comprises an $SiO_2$ film and is formed by a sputtering process.

3. The optical modulation system of claim 2, further comprising two modulation electrodes formed on said substrate and located in the vicinity of said two phase-shift optical waveguides.

4. The optical modulation system of claim 1, wherein said light transmission film is an $SiO_2$ film.

5. The optical modulation system of claim 1, further comprising two modulation electrodes formed on said substrate and located in the vicinity of said two phase-shift optical waveguides.

6. The optical modulation system of claim 1, further comprising two modulation electrodes formed on said substrate and located in the vicinity of said two phase-shift optical waveguides.

* * * * *